(12) United States Patent
Tsuzaki et al.

(10) Patent No.: US 9,389,743 B2
(45) Date of Patent: Jul. 12, 2016

(54) INFORMATION INPUT DEVICE, INFORMATION INPUT METHOD, INFORMATION INPUT/OUTPUT DEVICE, AND INFORMATION INPUT PROGRAM

(75) Inventors: Ryoichi Tsuzaki, Kanagawa (JP); Tsutomu Tanaka, Kanagawa (JP)

(73) Assignee: Japan Display Inc., Tokyo (JP)

( * ) Notice: Subject to any disclaimer, the term of this patent is extended or adjusted under 35 U.S.C. 154(b) by 655 days.

(21) Appl. No.: 12/461,407

(22) Filed: Aug. 11, 2009

(65) Prior Publication Data

US 2010/0053098 A1 Mar. 4, 2010

(30) Foreign Application Priority Data

Aug. 26, 2008 (JP) .................. 2008-217261

(51) Int. Cl.
*G06F 3/041* (2006.01)
*G06F 3/045* (2006.01)
*G06F 3/042* (2006.01)
*G02F 1/1333* (2006.01)
*G02F 1/1337* (2006.01)
(Continued)

(52) U.S. Cl.
CPC .............. *G06F 3/045* (2013.01); *G06F 3/0412* (2013.01); *G06F 3/0421* (2013.01); *G02F 1/13338* (2013.01); *G02F 1/133707* (2013.01); *G02F 2001/13396* (2013.01); *G02F 2001/13398* (2013.01); *G02F 2001/134372* (2013.01)

(58) Field of Classification Search
CPC ..................................................... G06F 3/041
USPC ................................................ 345/156, 173
See application file for complete search history.

(56) References Cited

U.S. PATENT DOCUMENTS 5,434,959 A * 7/1995 Von Ehr et al. ............... 345/441
6,377,249 B1 * 4/2002 Mumford ...................... 345/179
(Continued)

FOREIGN PATENT DOCUMENTS

CN 1419215 A 5/2003
CN 1945515 A 4/2007
(Continued)

OTHER PUBLICATIONS

Japanese Office Action issued Jun. 19, 2012 for corresponding Japanese Application No. 2008-217261.
(Continued)

*Primary Examiner* — Kumar Patel
*Assistant Examiner* — Afroza Chowdhury
(74) *Attorney, Agent, or Firm* — Michael Best & Friedrich LLP

(57) ABSTRACT

An information input device with a simple structure is provided, which allows information on an external proximity object to be conveniently inputted. The information input device includes: an input panel having a detection function of detecting an external proximity object; a position detection section acquiring position information and area information of the external proximity object based on a detection signal of the external proximity object obtained by the input panel; and an image generation section generating drawing data, which is to be used in a drawing process according to a behavior of the external proximity object, based on the position information and the area information so that the drawing process is performed in a manner according to an area value of the external proximity object represented by the area information.

8 Claims, 14 Drawing Sheets

(51) Int. Cl.
  *G02F 1/1339* (2006.01)
  *G02F 1/1343* (2006.01)

(56) References Cited

U.S. PATENT DOCUMENTS

| | | | | |
|---|---|---|---|---|
| 6,404,419 | B1* | 6/2002 | Nagashima | 345/173 |
| 6,421,042 | B1* | 7/2002 | Omura et al. | 345/157 |
| 6,429,856 | B1* | 8/2002 | Omura et al. | 345/175 |
| 6,608,619 | B2* | 8/2003 | Omura et al. | 345/175 |
| 6,760,009 | B2* | 7/2004 | Omura et al. | 345/157 |
| 7,006,080 | B2* | 2/2006 | Gettemy | 345/175 |
| 7,030,941 | B2* | 4/2006 | Kobayashi et al. | 349/33 |
| 7,053,968 | B2* | 5/2006 | Hong et al. | 349/12 |
| 7,293,697 | B2* | 11/2007 | Wiebe et al. | 235/375 |
| 7,352,366 | B2* | 4/2008 | Dresevic et al. | 345/179 |
| 7,397,465 | B2* | 7/2008 | Noji | 345/173 |
| 7,446,824 | B2* | 11/2008 | Kobayashi et al. | 349/33 |
| 7,499,055 | B2* | 3/2009 | Lin et al. | 345/467 |
| 7,714,966 | B2* | 5/2010 | Ishii | 349/129 |
| 7,737,637 | B2* | 6/2010 | Koshihara | G06F 3/044 313/506 |
| 7,782,333 | B2* | 8/2010 | Yamaguchi et al. | 345/581 |
| 7,855,713 | B2* | 12/2010 | Egashira | 345/156 |
| 7,872,722 | B2* | 1/2011 | Kimura | 349/141 |
| 7,907,126 | B2* | 3/2011 | Yoon et al. | 345/173 |
| 8,089,470 | B1* | 1/2012 | Schediwy et al. | 345/173 |
| 8,134,534 | B1* | 3/2012 | Gettemy | 345/173 |
| 8,228,301 | B2* | 7/2012 | Schneider | 345/173 |
| 8,314,782 | B2* | 11/2012 | Ino et al. | 345/175 |
| 8,482,538 | B2* | 7/2013 | Tsuzaki | G06F 3/044 345/173 |
| 8,487,886 | B2* | 7/2013 | Tsuzaki | G06F 3/0412 345/156 |
| 8,531,408 | B2* | 9/2013 | Xu et al. | 345/173 |
| 2003/0001825 | A1* | 1/2003 | Omura et al. | 345/173 |
| 2003/0006973 | A1* | 1/2003 | Omura et al. | 345/175 |
| 2003/0214490 | A1* | 11/2003 | Cool | 345/179 |
| 2004/0041759 | A1* | 3/2004 | Kobayashi et al. | 345/87 |
| 2004/0239652 | A1* | 12/2004 | Taylor et al. | 345/179 |
| 2004/0257347 | A1* | 12/2004 | Noji | 345/179 |
| 2005/0099405 | A1* | 5/2005 | Dietz et al. | 345/179 |
| 2005/0218307 | A1* | 10/2005 | Watari | 250/221 |
| 2005/0280761 | A1* | 12/2005 | Ishii | 349/130 |
| 2006/0098148 | A1* | 5/2006 | Kobayashi et al. | 349/130 |
| 2006/0170658 | A1* | 8/2006 | Nakamura et al. | 345/173 |
| 2007/0085837 | A1* | 4/2007 | Ricks et al. | 345/173 |
| 2007/0188429 | A1* | 8/2007 | Yamaguchi et al. | 345/88 |
| 2007/0229749 | A1* | 10/2007 | Kaneko et al. | 349/141 |
| 2007/0238529 | A1* | 10/2007 | Iwamoto et al. | 463/42 |
| 2008/0012732 | A1* | 1/2008 | Egashira | 340/990 |
| 2008/0018610 | A1* | 1/2008 | Harmon et al. | 345/173 |
| 2008/0143946 | A1* | 6/2008 | Wang et al. | 349/141 |
| 2008/0180410 | A1* | 7/2008 | McCall et al. | 345/179 |
| 2008/0211395 | A1* | 9/2008 | Koshihara | G06F 3/044 313/504 |
| 2009/0146967 | A1* | 6/2009 | Ino et al. | 345/173 |
| 2010/0207898 | A1* | 8/2010 | Cha | 345/173 |
| 2010/0253642 | A1* | 10/2010 | Tsuzaki et al. | 345/173 |

FOREIGN PATENT DOCUMENTS

| | | |
|---|---|---|
| JP | 03-041572 A | 2/1991 |
| JP | 03-171321 A | 7/1991 |
| JP | 11-085377 A | 3/1999 |
| JP | 11-272422 A | 10/1999 |
| JP | 2001-075074 A | 3/2001 |
| JP | 2004-318819 A | 11/2004 |
| JP | 2005-196310 A | 7/2005 |
| JP | 2007-257655 | 10/2007 |

OTHER PUBLICATIONS

Chinese Office Action issued Jul. 2, 2014 for corresponding Chinese Application No. 2009101704415.

\* cited by examiner

LINE WIDTH = A × AREA

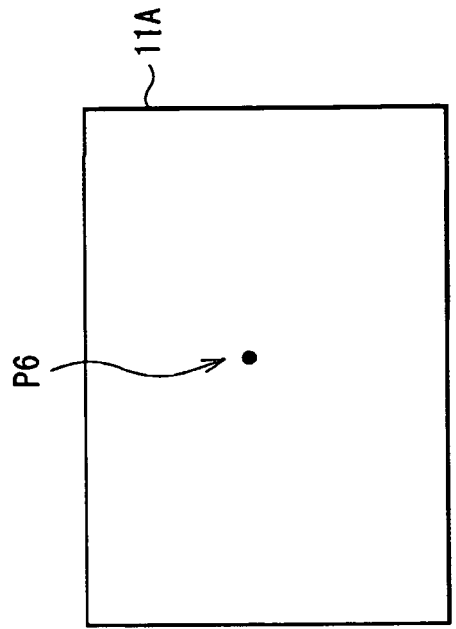
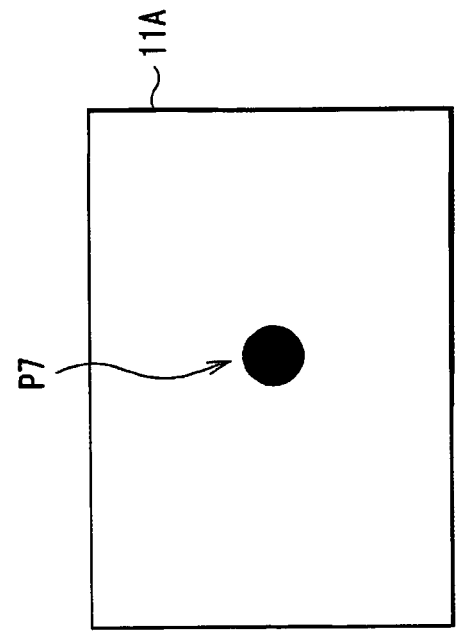
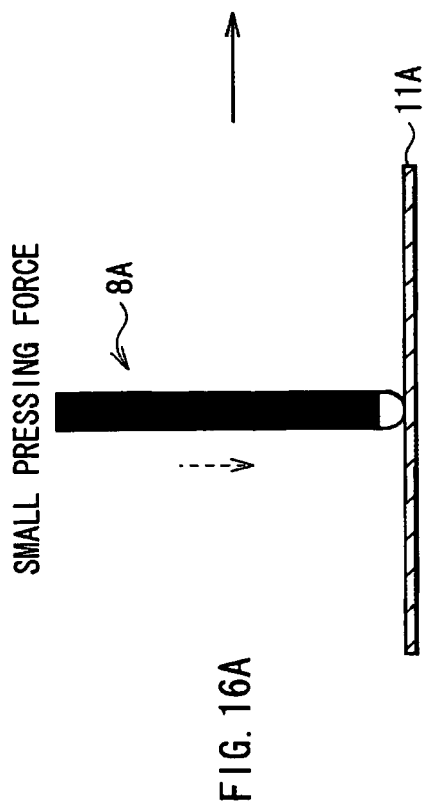
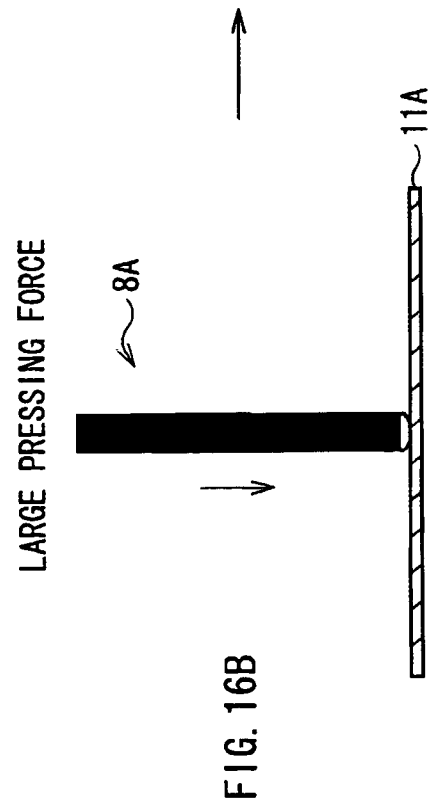
FIG. 16A  FIG. 16B

INFORMATION INPUT DEVICE, INFORMATION INPUT METHOD, INFORMATION INPUT/OUTPUT DEVICE, AND INFORMATION INPUT PROGRAM

BACKGROUND OF THE INVENTION

1. Field of the Invention

The present invention relates to an information input device, information input method and information input program for inputting information on an external proximity object, and relates to an information input/output device performing input/output of such information.

2. Background Art

Some image display devices have a touch panel. The touch panel includes a resistance-type touch panel using change in electric resistance, a capacitance-type touch panel using change in capacitance, and an optical touch panel optically detecting a finger or the like.

In such a touch panel, when a contact portion is drawn, line width or the like is sometimes desired to be changed depending on contact pressure (tool force) of an external proximity object such as a stylus in order to improve convenience in information input. A method of changing line width in such a manner is disclosed in, for example, Japanese Unexamined Patent Application, Publication No. 2007-257655.

SUMMARY OF THE INVENTION

In the Japanese Unexamined Patent Application, Publication No. 2007-257655, a special stylus is used to detect tool force, so that line width is changed. Specifically, a pressure sensor is used to detect tool force in the method.

However, in the method, a special mechanism (pressure sensor) as above has been necessary to be incorporated in the stylus, leading to a difficulty in cost or simplicity. Therefore, it has been desired that highly-convenient information input is achieved with a simple structure in the case that information on an external proximity object is inputted.

In view of foregoing, it is desirable to provide an information input device, an information input method, an information input/output device, and an information input program, which enables highly-convenient information input with a simple structure in the case that information on an external proximity object is inputted.

An information input device includes: an input panel having a detection function of detecting an external proximity object; a position detection section acquiring position information and area information of the external proximity object based on a detection signal of the external proximity object obtained by the input panel; and an image generation section generating drawing data, which is to be used in a drawing process according to a behavior of the external proximity object, based on the position information and the area information so that the drawing process is performed in a manner according to an area value of the external proximity object represented by the area information.

An information input method includes steps of: acquiring position information and area information of an external proximity object based on a detection signal of the external proximity object obtained by the input panel having a detection function of detecting the external proximity object; and generating drawing data, which is to be used in a drawing process according to a behavior of the external proximity object, based on the position information and the area information so that the drawing process is performed in a manner according to an area value of the external proximity object represented by the area information.

An information input/output device includes: an input/output panel having a detection function of detecting an external proximity object, and an image display function; a position detection section acquiring position information and area information of the external proximity object based on a detection signal of the external proximity object obtained by the input/output panel; and an image generation section generating drawing data, which is to be used in a drawing process according to a behavior of the external proximity object, based on the position information and the area information so that the drawing process is performed in a manner according to an area value of the external proximity object represented by the area information. The input/output panel performs image display based on the drawing data generated by the image generation section.

An information input program allows a computer to execute steps of: acquiring position information and area information of an external proximity object based on a detection signal of the external proximity object obtained by the input panel having a detection function of detecting the external proximity object; and generating drawing data, which is to be used in a drawing process according to a behavior of the external proximity object, based on the position information and the area information so that the drawing process is performed in a manner according to an area value of the external proximity object represented by the area information.

In the information input device, the information input method, the information input/output device, and the information input program of the invention, position information and area information of an external proximity object is acquired based on a detection signal of the external proximity object obtained by an input panel or an input/output panel. In addition, drawing data, which is to be used in a drawing process according to a behavior of the external proximity object, is generated based on the position information and the area information so that the drawing process is performed in a manner according to an area value of the external proximity object represented by the area information. That is, without detecting contact pressure of the external proximity object, the drawing data may be generated based on the position information and the area information so that the drawing process is performed in a manner according to an area value of the external proximity object represented by the area information.

According to the information input device, the information input method, the information input/output device, and the information input program of the invention, position information and area information of an external proximity object is acquired based on a detection signal of the external proximity object obtained by the input panel or the input/output panel, and drawing data, which is to be used in a drawing process according to a behavior of the external proximity object, is generated based on the position information and the area information so that the drawing process is performed in a manner according to an area value of the external proximity object represented by the area information. Therefore, without detecting contact pressure of the external proximity object, the drawing data may be generated based on the position information and the area information so that the drawing process is performed in a manner according to an area value of the external proximity object represented by the area information. Consequently, when information on an external prox-

BRIEF DESCRIPTION OF THE DRAWINGS

FIGS. 16A, 16B are schematic diagrams showing an example of contact operation to the input/output panel shown in FIG. 14 using an external proximity object (stylus)

DETAILED DESCRIPTION OF EMBODIMENT

Hereinafter, a preferred embodiment of the invention will be described in detail with reference to drawings.

First Embodiment

Figure 1:
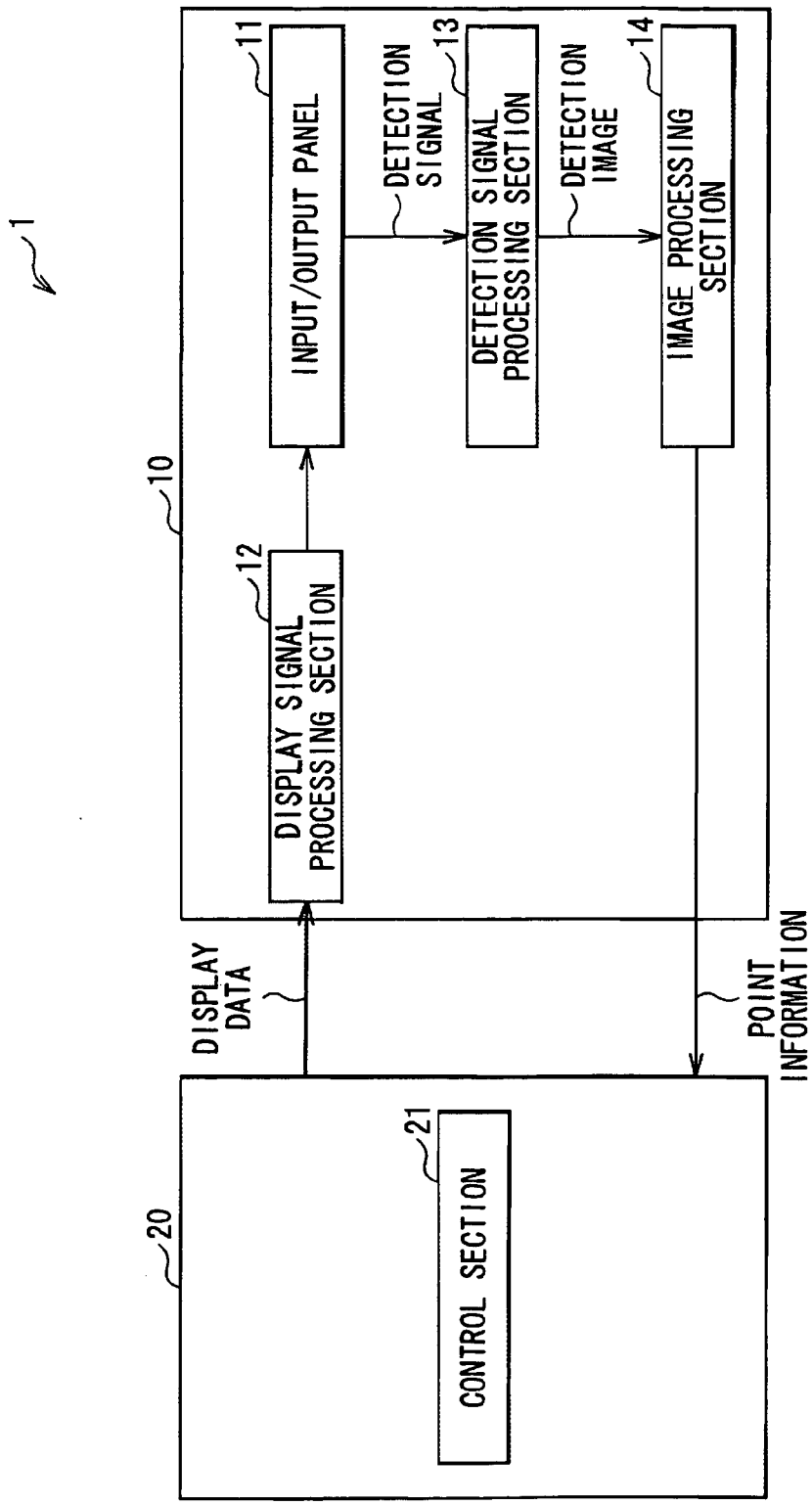
FIG. 1 is a block diagram showing a configuration of an information input/output device according to a first embodiment of the invention.

FIG. 1 shows a schematic configuration of an information input/output device 1 according to a first embodiment of the invention. FIGS. 2 to 5 show a detailed configuration of an input/output panel (input/output panel 11 described later) of the information input/output device 1. The information input/output device 1 has a display 10, and an electronic device body 20 using the display 10. The display 10 has an input/output panel 11, a display signal processing section 12, a detection signal processing section 13 and an image processing section 14. The electronic device body 20 has a control section 21. Since an information input method and an information input program according to the first embodiment of the invention are embodied in the information input/output device 1 of the embodiment, they are collectively described below.

Figure 2:
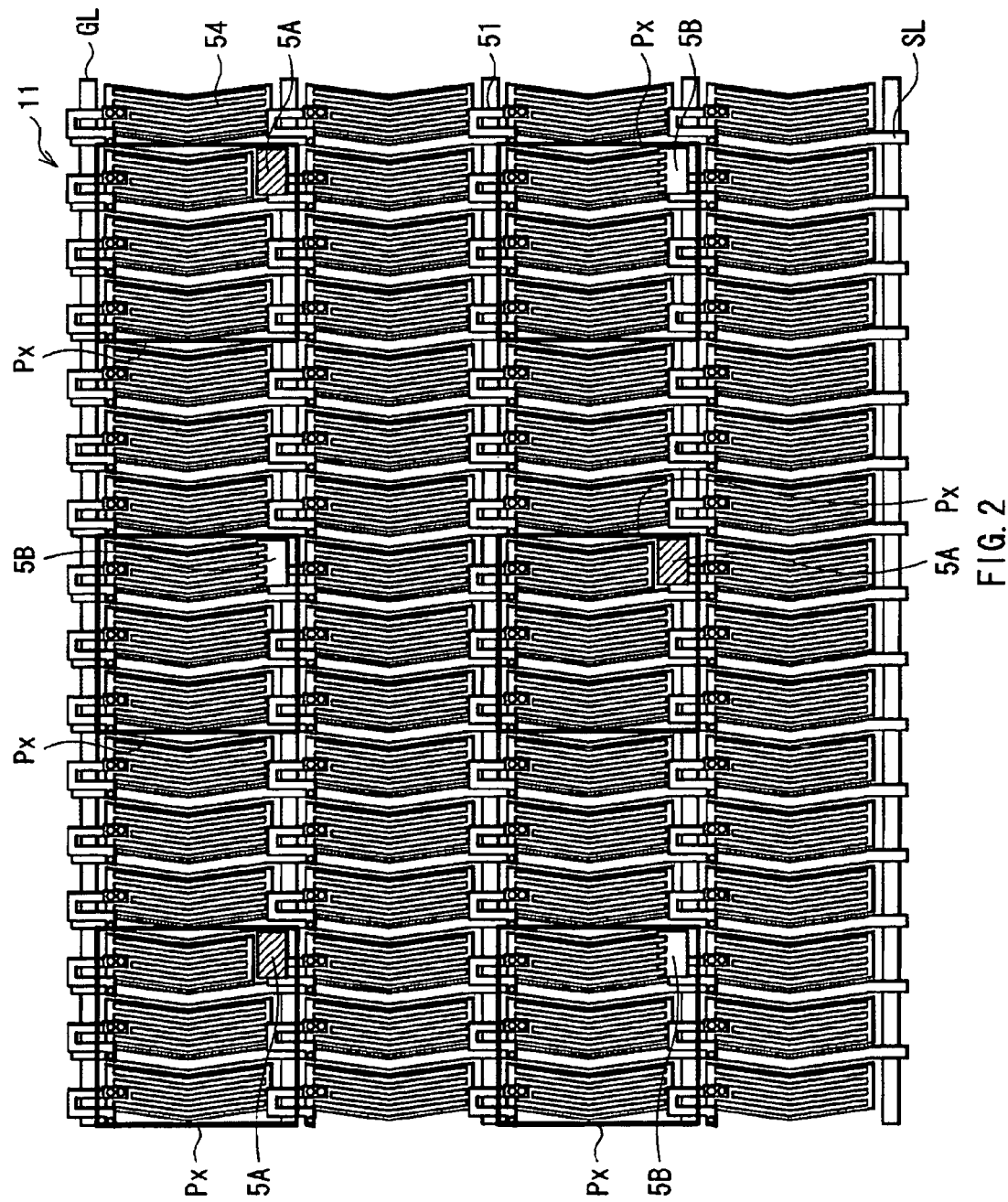
FIG. 2 is a plan diagram showing a configuration of an input/output panel shown in FIG. 1.

The input/output panel 11 has a detection function of detecting an external proximity object, and an image display function. Specifically, a liquid crystal display panel having a plurality of pixels arranged in a matrix form is made to have a resistance-film-type touch sensor function (function of acquiring a detection signal on an external proximity object such as external finger). FIG. 2 shows a planar configuration of the input/output panel 11. The input/output panel 11 is configured of, for example, a liquid crystal display panel of FFS (Fringe Field Switching) type, in which a plurality of signal lines SL are arranged in a column direction, and a plurality of gate lines GL are arranged in a row direction. A pixel transistor 51 and a pixel electrode 54 are provided near an intersection of each signal line SL and each gate line GL, which are corresponding to one sub-pixel. Furthermore, adjacent, three sub-pixels configure one pixel Px.

In the input/output panel 11, first space control columns 5A and second space control columns 5B are alternately provided at predetermined intervals (for example, at intervals of one row and four pixels). Each first space control column 5A has a function of a spacer for forming a gap of a liquid crystal layer 70 described later, and has a height equal to thickness of the liquid crystal layer 70, for example, about 3 μm. Each second space control column 5B is provided for disposing a second sensor electrode 62 described later, and has a height of, for example, about 2.5 μm being smaller than thickness of the liquid crystal layer 70. Each of the first and second space control columns 5A and 5B is configured of, for example, an organic film.

Figure 3:
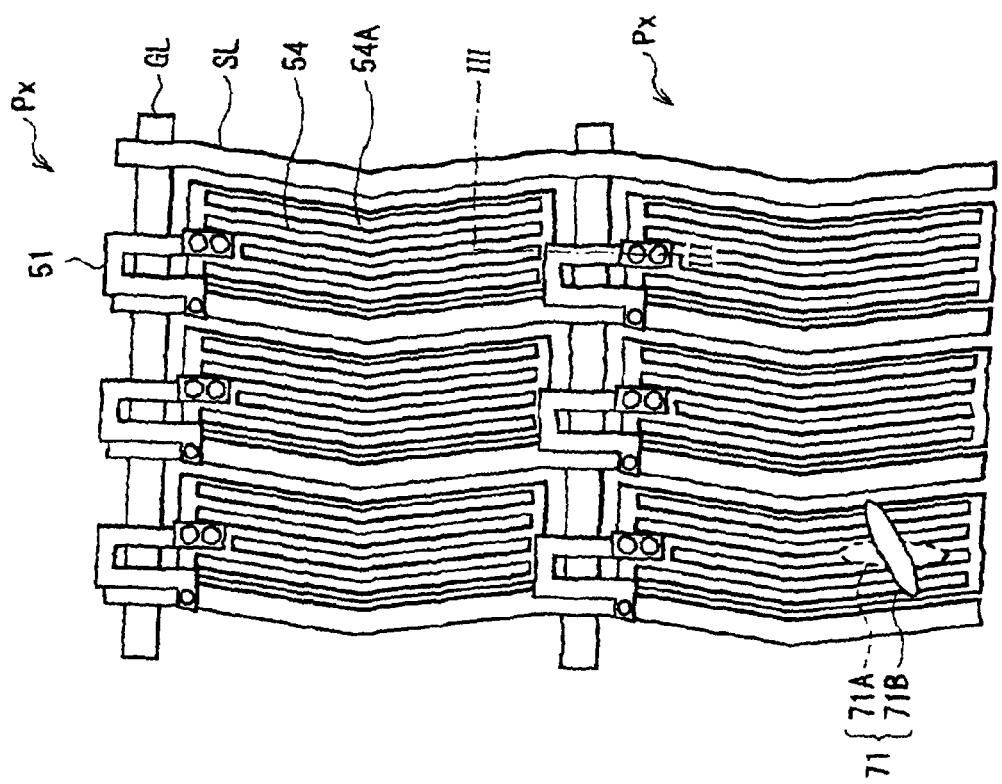
FIG. 3 is a plan diagram showing a pixel shown in FIG. 2 in an enlarged manner.
Figure 4:
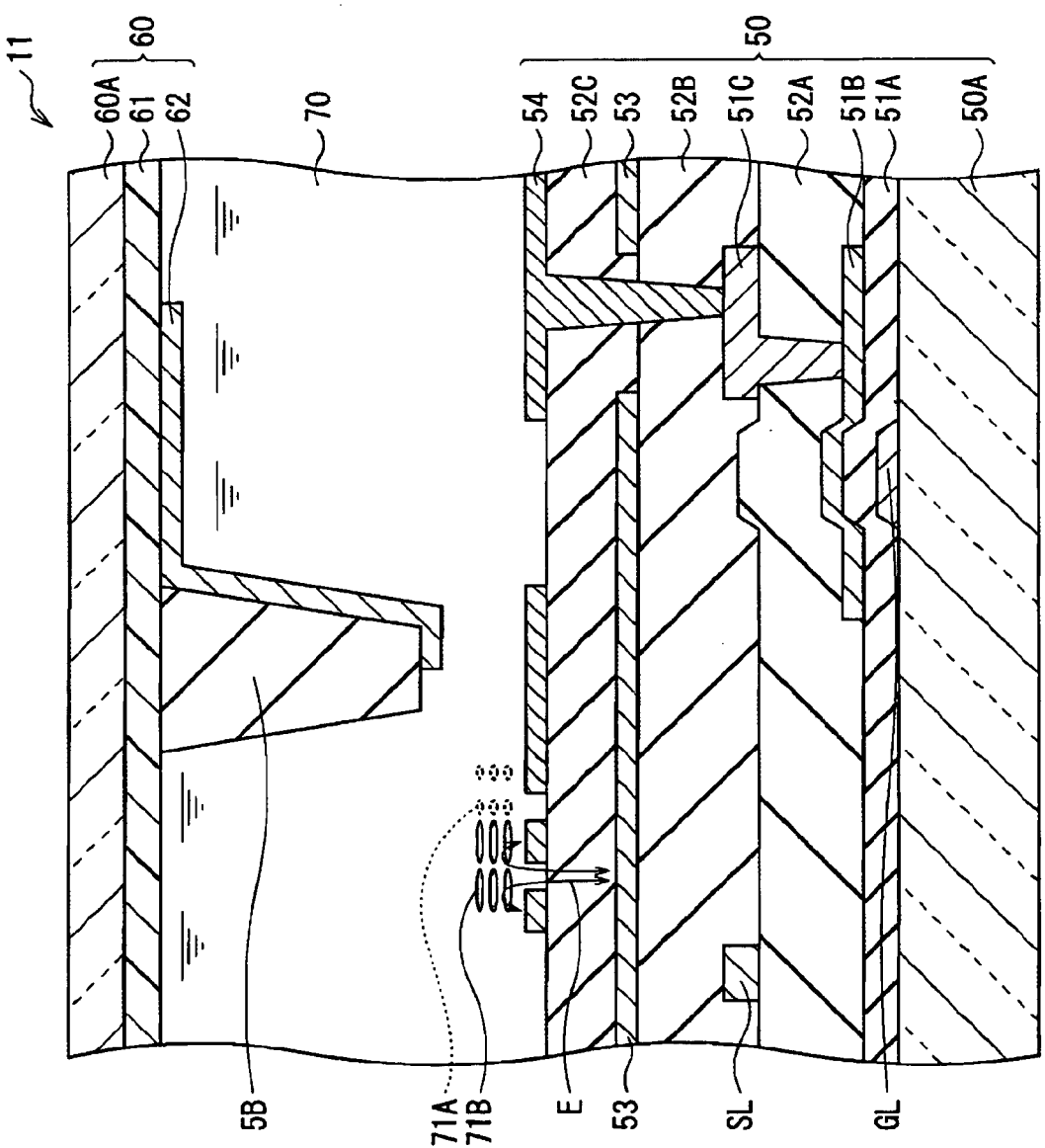
FIG. 4 is a section diagram along a polygonal line III-III in FIG. 3.

FIG. 3 shows part of the pixels Px shown in FIG. 2 in an enlarged manner, and FIG. 4 shows a sectional structure along a polygonal line III-III in FIG. 3. The input/output panel 11 has the liquid crystal layer 70 between a first substrate 50 and a second substrate 60.

The first substrate 50 includes pixel transistors 51, a first interlayer insulating film 52A, signal lines SL, a second interlayer insulating film 52B, common electrodes 53, a third interlayer insulating film 52C, and pixel electrodes 54, those being formed in order on a glass substrate 50A.

Each pixel transistor 51 has a configuration where a gate line GL, a gate insulating film 51A, and a semiconductor layer 51B are stacked in order on the glass substrate 50A, and the semiconductor layer 51B is electrically connected to a pixel electrode 54 via a contact portion 51C at the same layer level as the signal lines SL. The first interlayer insulating film 52A is preferably configured of, for example, an inorganic film.

Each of the pixel electrode 54 and the common electrode 53 acts as a display electrode for applying an electric field to the liquid crystal layer 70, and for example, has a thickness of about 50 nm to 100 nm, and is configured of a transparent conductive film such as ITO (Indium Tin Oxide) or ZnO. The pixel electrode 54 has a planar shape including a plurality of slits 54A, and the common electrode 53 is formed below the pixel electrode 54 with the third interlayer insulating film 52C including an inorganic insulating film in between. Electric potential provided to the pixel electrode 54 causes an electric field E to the common electrode 53 through the slits 54A. Thus, when an electric field is not applied, liquid crystal molecules 71A and 71B of the liquid crystal layer 70 are directed parallel to a longitudinal direction of each slit 54A as shown in a dotted line in FIGS. 3 and 4. However, when an electric field is applied, the molecules are directed perpendicularly to the longitudinal direction as shown in a solid line in FIGS. 3 and 4. The common electrodes 53 are desirably formed on the second interlayer insulating film 52B being a flattening film including an organic film so that high contrast display may be achieved.

Figure 5:
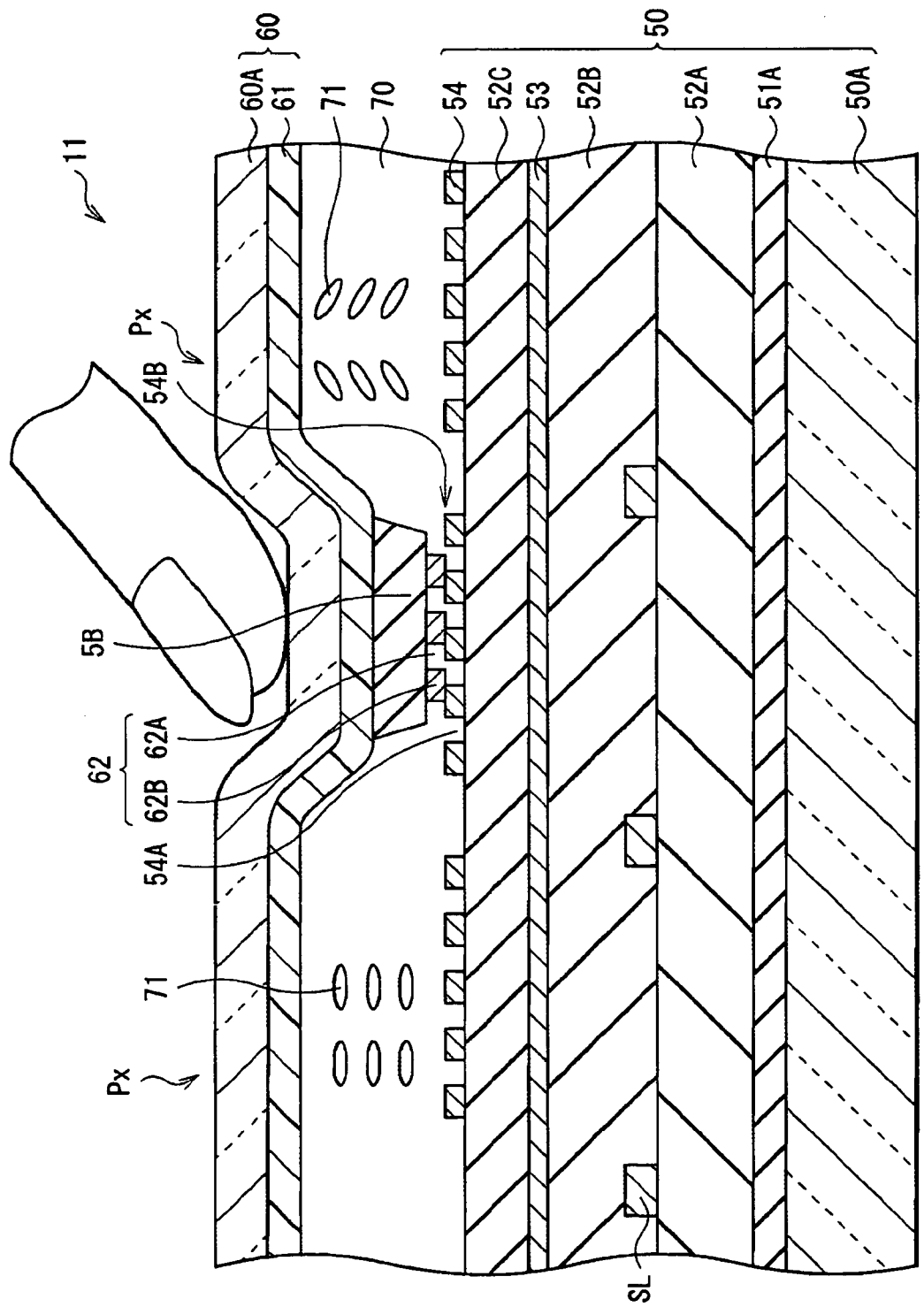
FIG. 5 is a section diagram showing a configuration example in information detection by the input/output panel shown in FIG. 1.

The second substrate 60 includes a color filter 61 including an organic film, the first space control columns 5A and the second space control columns 5B, those being formed on a glass substrate 60A. A counter sensor electrode 62 is formed on each second space control column 5B. For example, as shown in FIG. 5, when the second substrate 60 is deflected by a contacting body (for example, fingertip), the counter sensor electrode 62 may contact to the pixel electrode 54. That is, a resistance-film-type touch sensor as a position detection unit is formed within the input/output panel 11 by the pixel electrode 54 and the counter sensor electrode 62. Here, since the pixel electrode 54 includes a plurality of slits 54A, a sectional shape of the pixel electrode 54 has a plurality of edges 54B. The counter sensor electrode 62 (including a plurality of slits 62A and a plurality of patterns 62B) is disposed opposite the plurality of edges 54B of the pixel electrode 54. Thus, the input/output panel 11 may suppress instability of position detection. The pixel electrode 54 corresponds to a specific example of the "first sensor electrode" in the invention, and the counter sensor electrode 62 corresponds to a specific example of the "second sensor electrode" in the invention.

The display signal processing section 12 shown in FIG. 1 is a circuit that is connected to the input/output panel 11 as a previous stage, and drives the input/output panel 11 to display an image based on display data.

The detection signal processing section 13 is connected to the input/output panel 11 as a subsequent stage of the panel 11, and loads a detection signal obtained by the input/output panel 11 to perform amplification or the like of the signal.

The image processing section 14 is a circuit that is connected to the detection signal processing section 13 as a subsequent stage of the section 13, and loads a detection image from the section 13, and performs processing of the image, including binarization, noise removal and labeling, so as to obtain point information of an external proximity object, namely, the center of gravity or a center coordinate of the object, and obtain information showing a region (size or shape) of the object. Specifically, a labeling section (not shown) in the image processing section 14 performs labeling, thereby acquires label information on a detection image as a whole (information showing an identification number for each connected region in the detection image), and position information and area information for each connected region. A position detection section (not shown) in the image processing section 14 performs signal processing based on the label information, the position information and the area information obtained by the labeling section so as to specify a position or the like where a detected object exists. Thus, a position of a contacting or approaching finger or the like may be specified.

The electronic device body 20 outputs display data to the display signal processing section 12 in the display 10, and is inputted with point information having the content as above from the image processing section 14.

Figure 6:
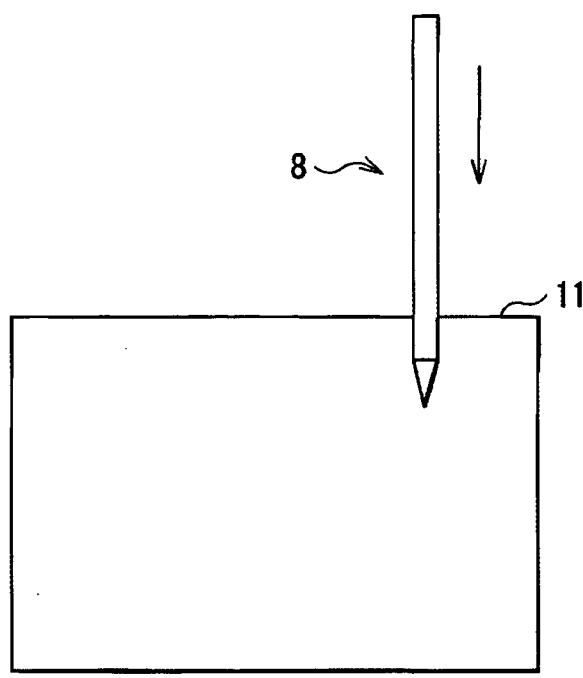
FIG. 6 is a schematic diagram showing an example of contact operation to the input/output panel using an external proximity object (stylus)
Figure 7A:
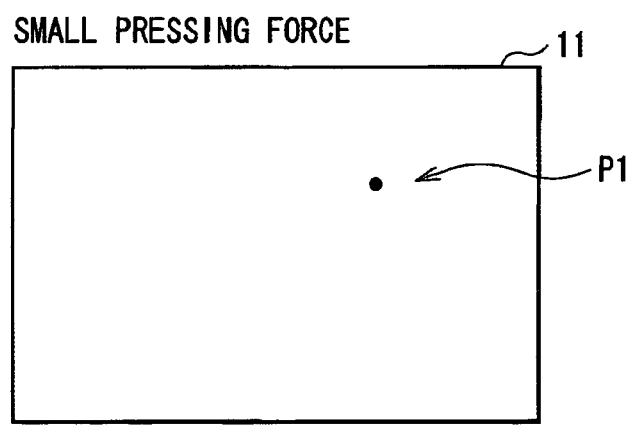
FIGS. 7A, 7B are plan diagrams for explaining a relationship between pressing force applied by a stylus and contact area (detection area)
Figure 7B:
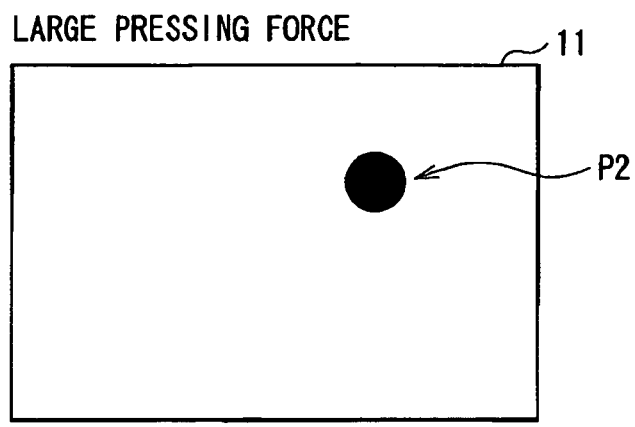

The control section 21 changes a display image using the point information, and is configured of, for example, CPU (Central Processing Unit). For example, when an external proximity object, a stylus 8, is contacted to the input/output panel 11 as shown in FIG. 6, the control section 21 generates drawing data (display data) of the external proximity object based on area information of the detected stylus 8. Specifically, for example, the control section uses a phenomenon that when the stylus 8 is contacted to the input/output panel 11, detection area of the stylus 8 is changed depending on pressing force (contact pressure or tool force) as shown in signs PI and P2 in FIGS. 7A, 7B. The control section 21 generates the drawing data (display data) of the external proximity object in accordance with an area value of the stylus 8 or the like at a detection position of the stylus 8 or the like based on the position information and the area information of the stylus 8 or the like obtained by the image processing section 14 (position detection section), and supplies the data to the display signal processing section 12. The input/output panel 11 performs image display based on the drawing data generated in this way. The control section 21 corresponds to a specific example of the "image generation section" in the example.

Figure 8:
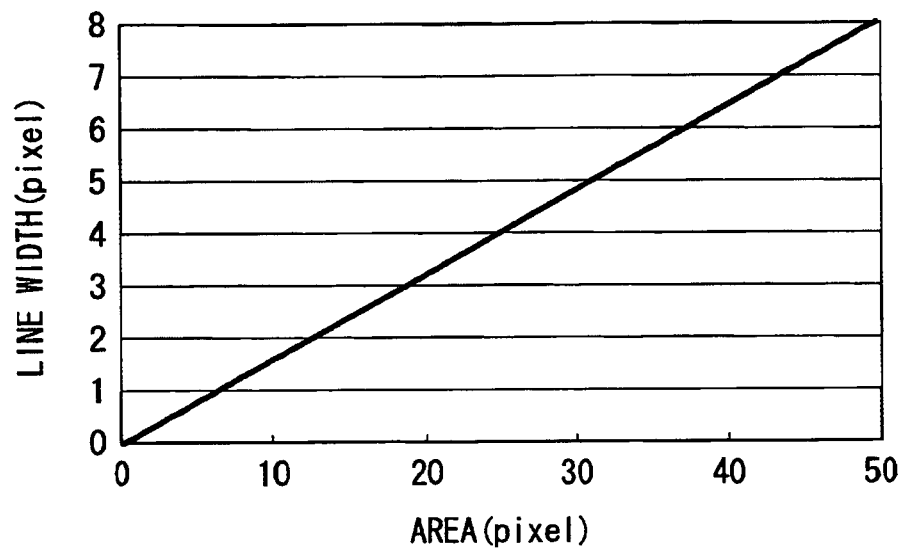
FIG. 8 is a characteristic diagram showing an example of a correspondence relationship between a detection area and line width set in drawing.

Specifically, the control section 21 generates drawing data such that when drawing is performed using an external proximity object, drawing attributive information including one or more of line width, a tone (luminance), and a hue is changed in accordance with an area value of the object. Here, a case is representatively described, where when drawing is performed using the external proximity object, drawing attributive information showing line width is changed in accordance with an area value of the object. In the case, the control section 21 converts acquired area information into line width by using a conversion table defining a correspondence relationship between the area value of an external proximity object and the line width in drawing, for example, as shown in FIG. 8. In FIG. 8, the correspondence relationship between an area value (Pixel) of an external proximity object and line width (Pixel) in drawing is defined by a simple linear function (line width=coefficient A*area). However, the correspondence relationship may be defined by another function (for example, a nonlinear function).

Figure 9:
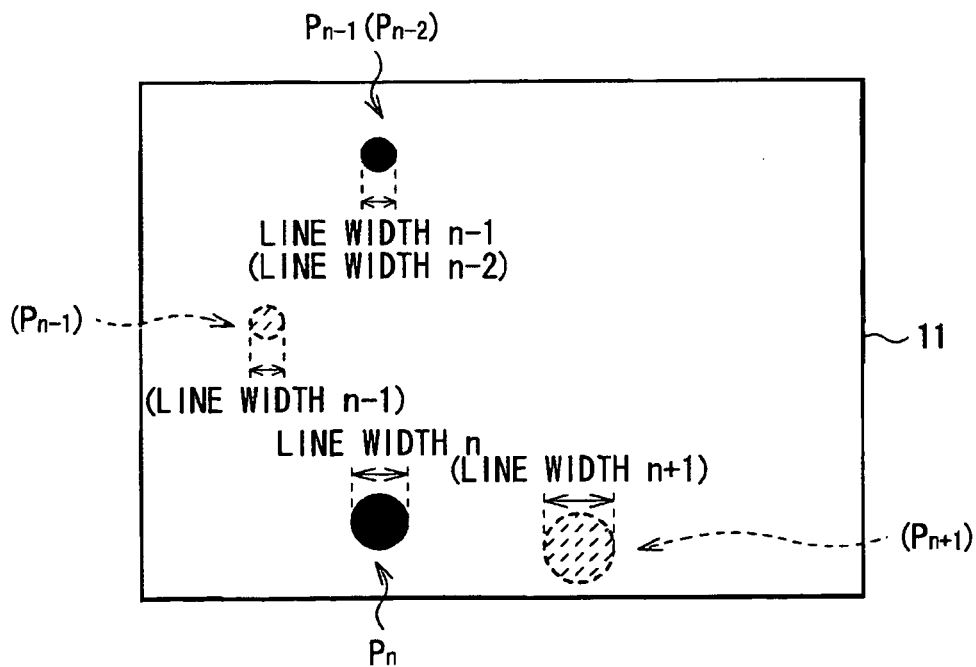
FIG. 9 is a plan diagram for explaining processing for achieving smooth drawing between unit frames.
Figure 10:
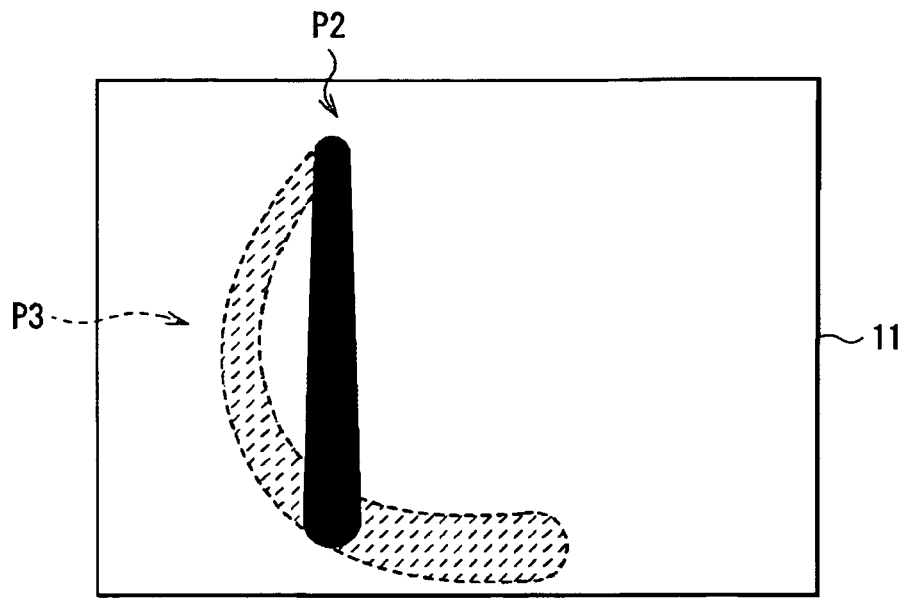
FIG. 10 is a plan diagram showing a drawing example on the input/output panel according to the processing shown in FIG. 9.

Furthermore, when drawing data are generated based on a plurality of drawing attributive information (line width (n−1) obtained in the (n−1)th frame, and line width n obtained in the nth frame) along time base, for example, as shown by signs Pn−1 and Pn in FIG. 9, the control section 21 preferably generates drawing attributive information in an interpolative manner. Specifically, the control section generates drawing attributive information in an interpolative manner such that drawing attributive information (here, line width) is gradually (smoothly) changed in drawing. Thus, when drawing is performed using an external proximity object in the input/output panel 11, drawing attributive information (here, line width) may be gradually (smoothly) changed, for example, as shown by a sign P2 in FIG. 10. In a pattern shown by the sign P2 in FIG. 10, a straight line is used to connect between two points of the line width (n−1) obtained in the (n−1)th frame, and the line width n obtained in the nth frame. However, another method may be used. Specifically, spline interpolation may be used so that line width is smoothly changed between three points of the line width (n−1) obtained in the (n−1)th frame, the line width n obtained in the nth frame, and line width (n+1) obtained in the (n+1)th frame, for example, as shown by dotted lines and notation in parentheses in FIG. 9 and a sign P3 in FIG. 10.

Figure 11:
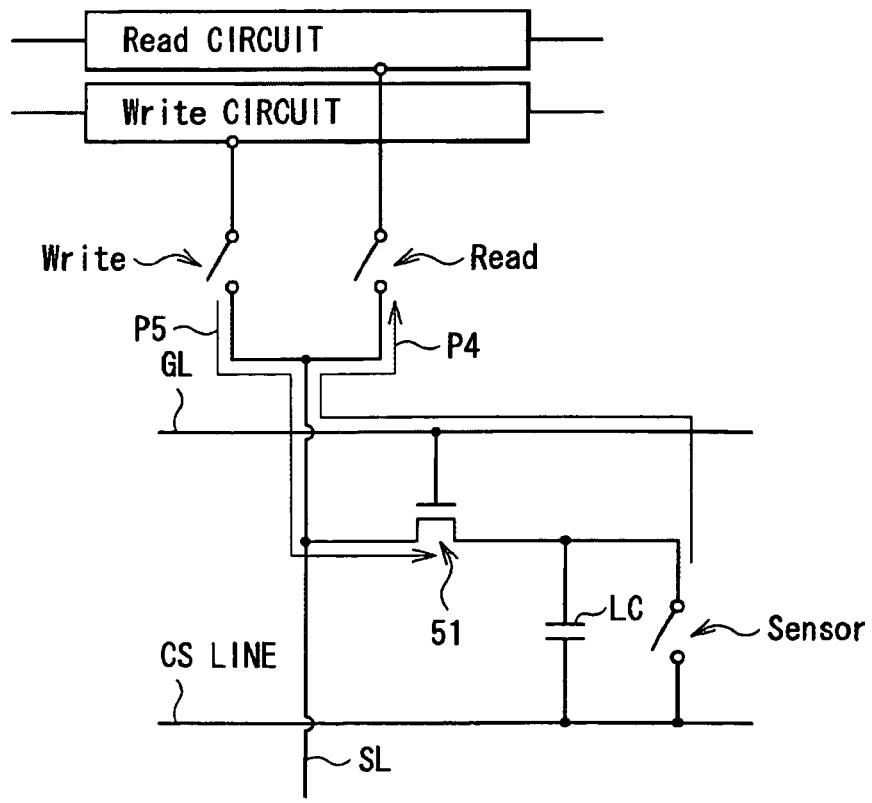
FIG. 11 is a circuit diagram for explaining a drive sequence in image display and information detection by the input/output panel shown in FIG. 1.
Figure 12:
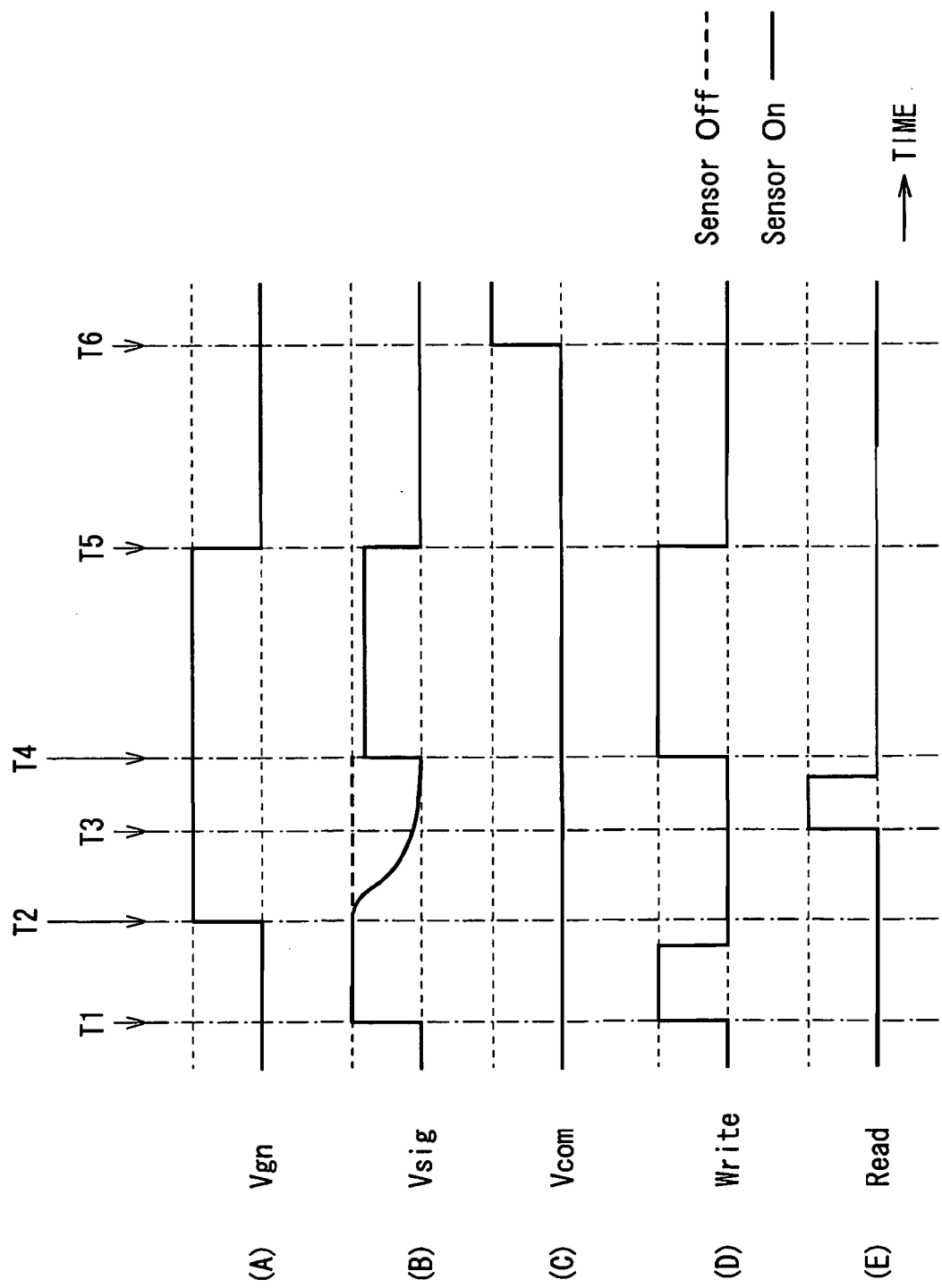
FIG. 12 is a timing waveform chart for explaining the drive sequence in image display and information detection by the input/output panel shown in FIG. 1.
Figure 13:
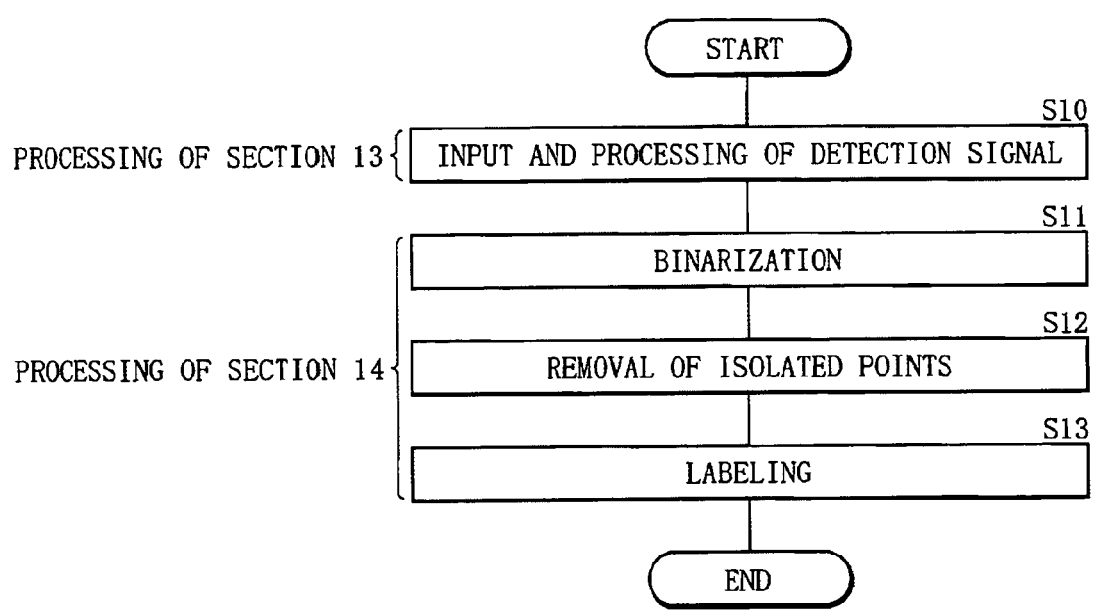
FIG. 13 is a flowchart of image processing as a whole performed by the information input/output device shown in FIG. 1.

Next, effects and advantages of the information input/output device 1 of the embodiment are described with reference to FIGS. 1 to 10 and FIGS. 11 to 13. FIGS. 11 and 12 show a drive sequence in image display and information detection by the input/output panel 11. FIG. 13 shows flow of image processing as a whole performed by the information input/output device 1.

First, the drive sequence in image display and information detection by the input/output panel 11 is described with reference to FIGS. 11 and 12. FIGS. 11 and 12 show a case where reading of electric potential of a pixel Px (information detection) and writing thereof (image display) are performed using common wiring.

As shown in FIG. 11, each pixel Px has a pixel transistor 51, a liquid crystal element LC, and a sensor Sensor. A gate of the pixel transistor 51 is connected to a gate line GL. A source of the pixel transistor 51 is connected to a signal line SL, and a drain thereof is connected to one end of the liquid crystal element LC and one end of the sensor Sensor. The signal line SL is connected to a Read circuit (corresponding to the detection signal processing section 13 shown in FIG. 1) via a Read switch, and connected to a Write circuit (corresponding to the display signal processing section 12 shown in FIG. 1) via a Write switch. The other end of the liquid crystal element LC and the other end of the sensor S are connected to a CS line respectively.

Here, a drive sequence of this circuit system is described with reference to FIG. 12. (A) of FIG. 12 shows electric potential Vgn of a gate line GL in the nth stage, (B) of FIG. 12 shows electric potential Vsig of the signal line SL, (C) of FIG. 12 shows electric potential Vcom of the CS line, (D) of FIG. 12 shows a state of the Write switch (an ON or OFF state), and (E) of FIG. 12 shows a state of the Read switch (an ON or OFF state), respectively.

First, the Write switch is turned on at timing T1 (refer to (D) of FIG. 12). Thus, as shown in (B) of FIG. 12, before a pixel Px is written with display potential, electric potential having an opposite phase to electric potential Vcom of the CS line is temporarily pre-charged from the Write circuit to a wired portion of the signal line SL.

Next, the Write switch is turned off, and then the electric potential Vgn is applied to the gate of the pixel transistor 51 via the gate line GL at timing T2, so that the pixel transistor 51 is turned on as shown in (A) of FIG. 12.

At that time, in the case that the pixel electrode 54 is contacted to the counter sensor electrode 62 (for example, a condition where the second substrate 60 is pressed and thus deflected as shown in FIG. 5), the electric potential Vsig of the signal line SL is momentarily equal to the electric potential Vcom of the CS line (refer to a solid line portion in FIG. 12B). On the other hand, in the case that the pixel electrode 54 is not contacted to the counter sensor electrode 62 (a condition where the second substrate 60 is not pressed), the pre-charged electric potential is held on the signal line SL (refer to a dotted line portion in (B) of FIG. 12).

Next, the Read switch is turned on at timing T3 (refer to (E) of FIG. 12). Thus, the electric potential Vsig of the signal line SL is read into the Read circuit via a path P4 shown in FIG. 11. In the case that the pixel electrode 54 is contacted to the counter sensor electrode 62, a contact position is sensed in a matrix fashion based on the read data, so that a detection signal for position detection (information detection) is obtained.

Next, the Read switch is turned off, and then the Write switch is turned on again at timing T4 (refer to (D) of FIG. 12). Thus, display potential for the pixel Px is written into the liquid crystal element LC from the Write circuit via the signal line SL and the pixel transistor 51 as shown by a path P5 in FIG. 11 (refer to (B) of FIG. 12). Then, at timing T5, the pixel transistor 51 is turned off (refer to (A) of FIG. 12), and the Write switch is turned off (refer to (D) of FIG. 12), so that display potential at the pixel Px is established. Thus, image display based on display data is performed. After that, the electric potential Vcom of the CS line is reversed at timing T6.

Next, operation of the information input/output device 1 as a whole is described with reference to FIG. 13.

First, display data outputted from the electronic device body 20 are inputted into the display signal processing section 12. The display signal processing section 12 drives the input/output panel 11 such that an image is displayed on the panel 11 based on the display data.

The input/output panel 11 acquires a detection signal of an external proximity object according to the drive sequence. The detection signal processing section 13 is inputted with the detection signal, and performs processing of the signal, such as amplification (step S10 in FIG. 13). In this way, the detection signal processing section 13 obtains a detection image.

Next, the image processing section 14 is inputted with the detection image from the detection signal processing section 13, and performs binarization to the detection image (step S11). That is, the image processing section 14 stores a beforehand set threshold value, and for example, performs binarization where whether signal intensity of detection image data is lower than the threshold value or not is comparatively determined, so that signal intensity is set to "0" or "1". Thus, a portion, where the pixel electrode 54 is contacted to the counter sensor electrode 62 by the external proximity object, is set to "1", and other portions are set to "0".

Then, the image processing section 14 removes isolated points from the binarized detection image (step S12). That is, in the case that the detection image is binarized as above, the image processing section 14 removes each portion set to "1" as a portion isolated from the external proximity object, and thereby removes noise.

Then, the image processing section 14 performs labeling in the labeling section (not shown) (step S13). That is, in the case that the detection image is binarized as above, the labeling section performs labeling to a portion set to "1". Then, the labeling section detects a region set to "1" as a region of the external proximity object, and acquires the label information, the position information, and the area information respectively. Such data are outputted to the control section 21 as point information.

Next, the control section 21 performs necessary processing such as change of a display image by using the point information inputted from the image processing section 14. For example, when a case that some operational menu is displayed on a screen is assumed, the section 21 detects which button is selected from the operational menu by a user finger, and executes a command corresponding to the selected button. This is the end of basic operation of the information input/output device 1.

In the information input/output device 1 of the embodiment, the detection signal processing section 13 and the image processing section 14 acquire position information and area information of the external proximity object based on a detection signal of the object obtained by the input/output panel 11. The control section 21 generates drawing data (display data), which is to be used in a drawing process according to a behavior of the external proximity object, based on the position information and the area information so that the drawing process is performed in a manner according to an area value of the external proximity object represented by the area information, for example, as shown in the above FIGS. 6 to 10. Specifically, for example, as shown in FIG. 8, drawing data are generated such that when drawing is performed using the external proximity object, drawing attributive information including one or more of line width, a tone, and a hue is changed in accordance with an area value of the object. The input/output panel 11 performs image display based on the drawing data generated in this way.

That is, without detecting contact pressure (pressing force or tool force) of the object unlike in the past, drawing data, which is to be used in a drawing process according to a behavior of the external proximity object, may be generated based on the position information and the area information so that the drawing process is performed in a manner according to an area value of the external proximity object represented by the area information.

As hereinbefore, in the embodiment, the detection signal processing section 13 and the image processing section 14 acquire position information and area information of an external proximity object based on a detection signal of the object obtained by the input/output panel 11, and the control section 21 generates drawing data (display data), which is to be used in a drawing process according to a behavior of the external proximity object, based on the position information and the area information so that the drawing process is performed in a manner according to an area value of the external proximity object represented by the area information. Therefore, without detecting contact pressure of the object unlike in the past, the drawing data may be generated based on the position information and the area information so that the drawing process is performed in a manner according to an area value of the external proximity object represented by the area information. Consequently, when information on the external proximity object is inputted, highly-convenient information input may be performed with a simple structure.

In the following case, more highly-convenient information input may be performed: when a plurality pieces of the area information are acquired along time base in accordance with movement of the external proximity object, drawing attributive information (including one or more drawing attribution of line width, a tone, and a hue to be specified in the drawing process) is determined according to each piece of the area information, and then, based on the obtained drawing attributive information, an interpolation process is performed, the interpolation process allowing additional drawing attributive information to be generated and inserted, so that drawing attribution gradually varies when the drawing process is performed. Second embodiment Next, a second embodiment of the invention is described. An image input/output device of the embodiment is made such that the image input/output device 1 of the first embodiment shown in FIG. 1 has an input/output panel including an optical touch sensor (input/output panel 11A described later) in place of the input/output panel 11 including the resistance-film-type touch sensor. The same components as in the first embodiment are marked with the same reference numerals or signs, and appropriately omitted to be described. Since an information input method and an information input program according to the second embodiment of the invention are embodied in the image input/output device of the embodiment, they are collectively described below.

Figure 14:
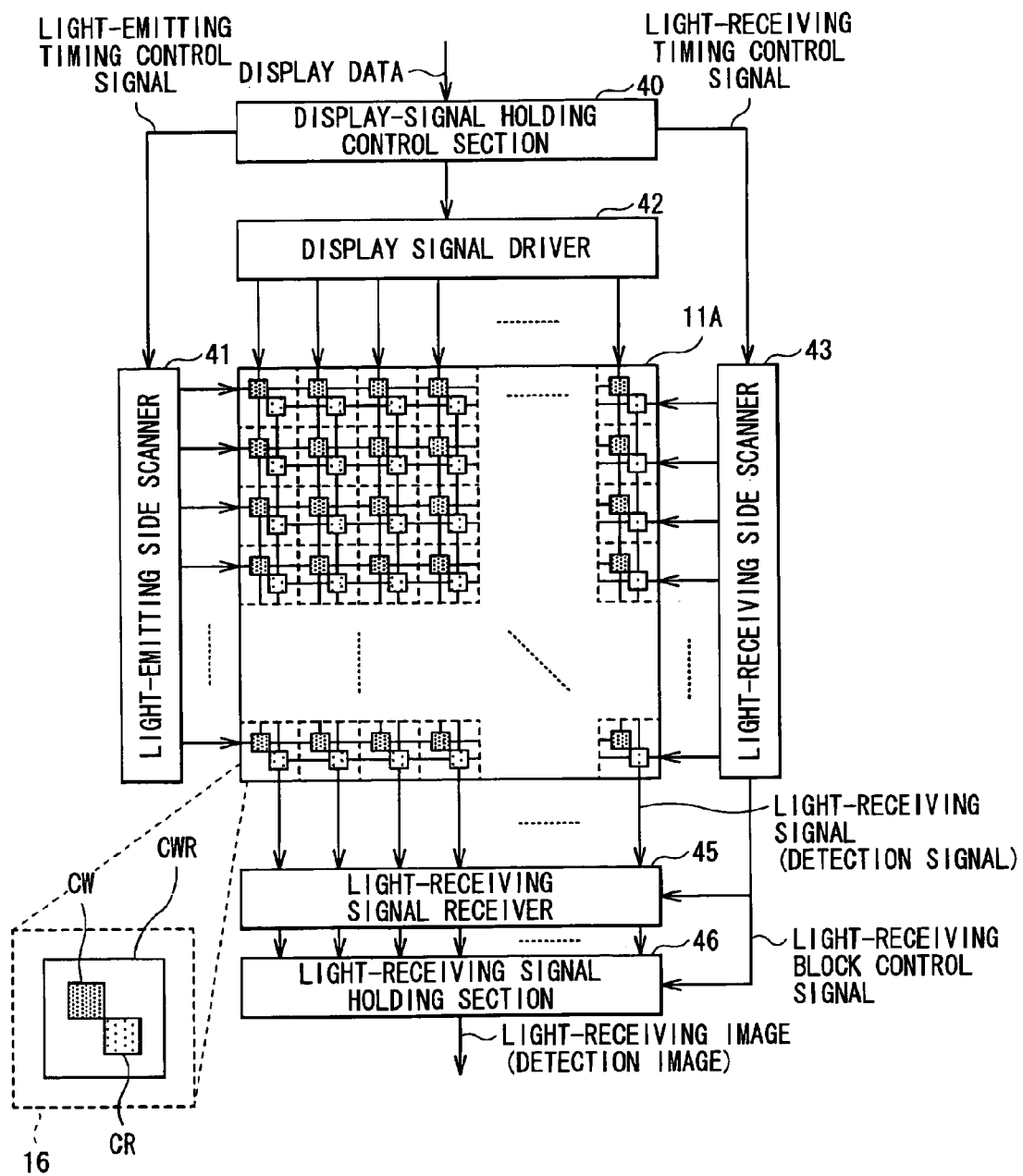
FIG. 14 is a block diagram showing a detailed configuration of a display including the input/output panel according to a second embodiment.
Figure 15:
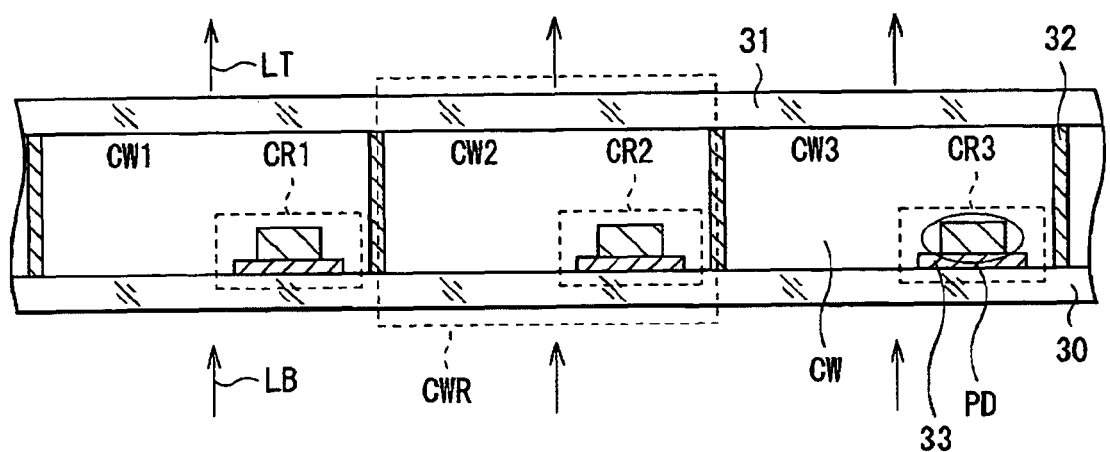
FIG. 15 is a section diagram showing part of the input/output panel shown in FIG. 14 in an enlarged manner.

FIG. 14 shows a detailed configuration of a display 10 including the input/output panel 11A according to the embodiment. FIG. 15 shows a section of a part of the input/output panel 11A in an enlarged manner.

As shown in FIG. 14, the input/output panel 11A is configured of a liquid crystal display panel in which a plurality of pixels 16 are arranged in a matrix form, and includes display members (corresponding to light-emitting cells CW described later) and light-receiving members (corresponding to light-receiving cells CR described later). That is, even the input/output panel 11A has a detection function of detecting an external proximity object, and an image display function in the same manner as the input/output panel 11. Each of the display members is a liquid crystal element displaying an image of graphics, letters or the like on a display surface by using light emitted from a backlight being a light source. Each of the light-receiving members is a light-receiving element such as photodiode, which receives light and outputs a corresponding electric signal. The light-receiving member receives light being emitted from the backlight, and then reflected by an external proximity object such as a finger outside the input/output panel 11A, and then returned, and outputs a light-receiving signal (detection signal). In the case of the embodiment, the light-receiving members are disposed for each pixel 16, and plurally arranged in a plane.

As shown in FIGS. 14 and 15, the input/output panel 11A is configured in such a manner that a plurality of light-emitting/light-receiving cells CWR structured to be separated from one another by partitions 32 are arranged in a matrix form between a pair of transparent substrates 30 and 31. The respective light-emitting/light-receiving cells CWR have light-emitting cells CW (CW1, CW2, CW3, ... ), and a plurality of light-receiving cells (CR1, CR2, CR3, ...) encapsulated in the respective light-emitting cells CW. Each light-emitting cell CW includes a liquid crystal cell as a display member, and each light-receiving cell includes a light-receiving element PD as a light-receiving member. The light-receiving cell CR has a shielding layer 33 disposed between the transparent substrate 30 on a backlight side and the light-receiving element PD so as to prevent incidence of light LB emitted from the backlight. Thus, each light-receiving element PD detects only light injected in a direction from the transparent substrate 31 on a side opposite to the backlight side without being affected by the light LB from the backlight.

Here, the display signal processing section 12 shown in FIG. 1 has a display-signal holding control section 40, a light-emitting-side scanner 41, a display-signal driver 42, and a light-receiving-side scanner 43 shown in FIG. 14. The display-signal holding control section 40 has a function of storing and holding display data outputted from the control section 21 in a field memory configured of, for example, SRAM (Static Random Access Memory) for each image plane (for each field display), and has a function of controlling the light-emitting-side scanner 41 and the display-signal driver 42 for driving each light-emitting cell CW, and the light-receiving-side scanner 43 for driving each light-receiving cell CR to be operated in an interlocking manner. Specifically, the control section 40 outputs a light-emitting timing control signal to the light-emitting-side scanner 41, a light-receiving timing control signal to the light-receiving-side scanner 43, and a display signal for one horizontal line to the display-signal driver 42 based on a control signal and display signals held in the field memory. According to the control signals and the display signal, line sequential operation is performed.

The light-emitting-side scanner 41 has a function of selecting a light-emitting cell CW as a driving object in response to the light-emitting timing control signal outputted from the display-signal holding control section 40. Specifically, the scanner 41 supplies a light-emitting selection signal via a light-emitting gate line connected to each pixel 16 in the input/output panel 11A to control a light-emitting element selection switch. That is, when a voltage, which allows a light-emitting element selection switch of a particular pixel 16 to be turned on, is applied to the switch by the light-emitting selection signal, the pixel 16 performs light-emitting operation with luminance corresponding to a voltage supplied from the display-signal driver 42.

The display-signal driver 42 has a function of supplying display data to a light-emitting cell CW as a driving object in response to the display signal for one horizontal line outputted from the display-signal holding control section 40. Specifically, the driver 42 supplies a voltage corresponding to display data to a pixel 16 selected by the light-emitting-side scanner 41 via a data supply line connected to each pixel 16 in the input/output panel 11A. The light-emitting-side scanner 41 and the display-signal driver 42 are interlocked so that line sequential operation is performed, thereby an image corresponding to an optional display data is displayed on the input/output panel 11A.

The light-receiving-side scanner 43 has a function of selecting a light-receiving cell CR as a driving object in response to the light-receiving timing control signal outputted from the display-signal holding control section 40. Specifically, the scanner 43 supplies a light-receiving selection signal via a light-receiving gate line connected to each pixel 16 in the input/output panel 11A to control a light-receiving element selection switch. That is, in the same manner as operation of the light-emitting-side scanner 41, when a voltage, which allows a light-receiving element selection switch of a particular pixel 16 to be turned on, is applied to the switch by a light-receiving selection signal, a light-receiving signal detected from the pixel 16 is outputted to a light-receiving signal receiver 45. Thus, for example, the light-receiving cell CR may receive and detect light being emitted from a particular light-emitting cell CW, and reflected by a contacting or approaching object. In addition, the light-receiving-side scanner 43 has a function of outputting a light-receiving block control signal to the light-receiving signal receiver 45 and the light-receiving signal holding section 46, and thus controlling such a block contributing to light-receiving operation. In the image input/output device of the embodiment, the light-emitting gate line and the light-receiving gate line are separately connected to each light-emitting/light-receiving cell CWR, so that the light-emitting-side scanner 41 and the light-receiving-side scanner 43 may be separately operated from each other.

A detection signal (light-receiving signal) processing section 13 as shown in FIG. 1 has the light-receiving signal receiver 45 and the light-receiving signal holding section 46 shown in FIG. 14.

The light-receiving signal receiver 45 has a function of acquiring a light-receiving signal (detection signal) for one horizontal line outputted from each light-receiving cell CR in response to the light-receiving block control signal outputted from the light-receiving-side scanner 43. The light-receiving signal for one horizontal line acquired by the light-receiving signal receiver 45 is outputted to the light-receiving signal holding section 46.

The light-receiving signal holding section 46 has a function of reconfiguring a light-receiving signal outputted from the light-receiving signal receiver 45 into a light-receiving image (detection image) corresponding to a light-receiving signal for each image plane (for each field display) in response to the light-receiving block control signal outputted from the light-receiving-side scanner 43, and storing and holding the light-receiving image in a field memory configured of, for example, SRAM. Data of the light-receiving signal (a light-receiving image) stored by the light-receiving signal holding section 46 are outputted to a position detection section (not shown) in the image processing section 14 (FIG. 1). The light-receiving signal holding section 46 may be configured of a storage element other than a memory. For example, the light-receiving signal may be held in a capacitance element as analog data (electric charges).

Next, effects and advantages of the information input/output device of the embodiment are described with reference to FIGS. 1, 14 and 15. Since basic operation of the information input/output device as a whole is the same as in the first embodiment, operation of each of image display and information detection by the input/output panel 11A is mainly described.

The input/output panel 11A drives light-receiving members (corresponding to the light-receiving cells CR) while displaying an image on display members (corresponding to the light-emitting cells CW) using light emitted from the backlight. When an external proximity object such as a finger is contacted to or approaches a display member, an image displayed on the display member is reflected by the external proximity object, and the reflected light is detected by a light-receiving member. In response to such detection, the light-receiving member outputs a light-receiving signal (detection signal). The detection signal (light-receiving signal) processing section 13 is inputted with the light-receiving signal, and performs processing of the signal such as amplification (step S10 in FIG. 13). In this way, the detection signal processing section 13 obtains a detection image (pickup image) in the same manner as in the first embodiment.

Even in the information input/output device of the embodiment, as in the information input/output device 1 of the first embodiment, the control section 21 generates drawing data (display data), which is to be used in a drawing process according to a behavior of the external proximity object, based on the position information and the area information so that the drawing process is performed in a manner according to an area value of the external proximity object represented by the area information. Thus, the same effects and thus the same advantages as in the first embodiment may be obtained. That is, when information on the external proximity object is inputted, highly-convenient information input may be performed with a simple structure.

Since the input/output panel 11A of the embodiment acts as an optical touch sensor, a stylus 8A having a soft pen tip is preferably used, for example, as shown by signs P6 and P7 in FIGS. 16A and 16B. This is because when the stylus 8A is contacted to the input/output panel 11A, detection area of the stylus 8A is changed depending on pressing force (contact pressure or tool force) as in the first embodiment.

In the embodiment, one light-receiving cell CR is provided in correspondence to one light-emitting cell CW. However, one light-receiving cell CR may be provided in correspondence to a plurality of light-emitting cells CW.

Hereinbefore, the invention has been described with the first and second embodiments. However, the invention is not limited to the embodiments, and may be variously altered or modified.

Figure 17:
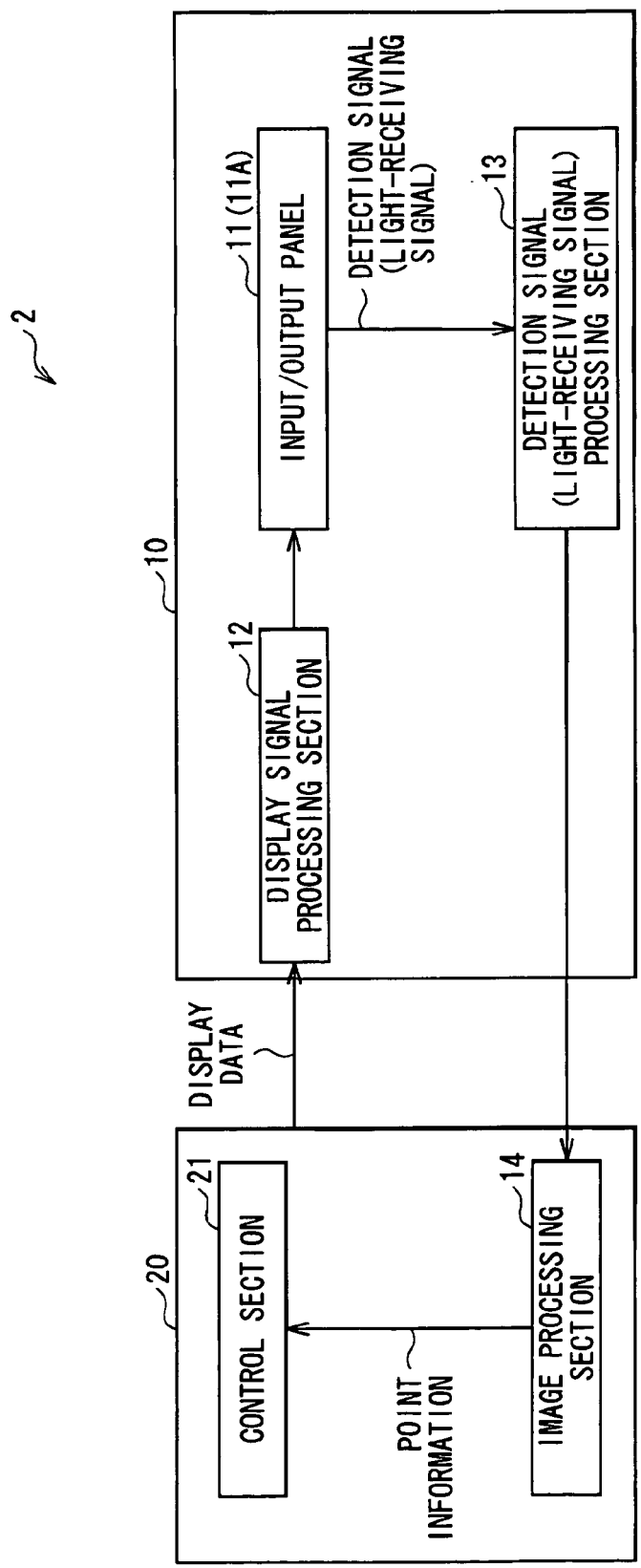
FIG. 17 is a block diagram showing a configuration of an information input/output device according to a modification of the invention.

For example, the information input/output device of the invention is not limited to the information input/output device 1 described in the embodiments, and for example, the invention may be used for an information input/output device 2 as shown in FIG. 17. The information input/output device 2 is different from the information input/output device 1 according to the embodiments in that the image processing section 14 is provided in the electronic device body 20. That is, the information input/output device 2 is made such that the display signal processing section 12, the input/output panel 11 (or input/output panel 11A), and the detection signal (light-receiving signal) processing section 13 are provided in the display 10, and the control section 21 and the image processing section 14 are provided in the electronic device body 20. Even if such an information input/output device 2 is used, the same advantages as in the information input/output device 1 according to the embodiments may be exhibited.

While a case where the control section 21 is provided in the electronic device body 20 has been described hereinbefore, the control section 21 may be provided in the display 10.

While the invention has been described illustrating the information input/output device 1 or 2 having the input/output panel 11 or 11A having the detection function of detecting an external proximity object and the image display function, the invention may be applied to an information input device (image pickup device) with an input panel having a detection function of detecting an external proximity object. That is, such an input panel may be separately provided from an output panel (display panel) performing image display based on display data (drawing data of an external proximity object) generated by the control section 21.

The information input/output device 1 or 2 described hereinbefore has a configuration where a liquid crystal display panel is used as the input/output panel 11 or 11A. However, the information input device of the invention may have a configuration where an organic electroluminescence (EL) panel or the like is used as the input/output panel. The organic EL element has a property that when the EL element is applied with a forward bias voltage, it performs light emission operation, and when the EL element is applied with a reverse bias voltage, it receives light and generates a current. Therefore, the organic EL element has a display member and a light-receiving member. In the case of such a configuration, the input/output panel is configured by disposing organic EL elements for each pixel, and when some organic EL elements are applied with a forward bias voltage according to display data so that the EL elements perform light emission operation, the panel displays an image while other organic EL elements are applied with a reverse bias voltage so as to receive reflected light.

A series of processing described in the embodiments may be carried out by either of hardware and software. When the series of processing is carried out by software, a program configuring the software is installed into a general purpose computer or the like. Such a program may be beforehand stored in a recording medium built in a computer.

Furthermore, the information input/output device and the like described hereinbefore may be used for an electronic device in any field where an externally inputted video signal or an internally generated video signal is displayed in a form of a picture or a video image, the electronic device including a TV apparatus, a digital camera, a notebook computer, a mobile terminal such as mobile phone, a video camera, or the like.

The present application contains subject matter related to that disclosed in Japanese Priority Patent Application JP 2008-217261 filed in the Japan Patent Office on Aug. 26, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information input-output device configured to perform a display operation that utilizes a plurality of pixels formed in a matrix and a detection operation that detects a plurality of external proximity objects, the information input-output device comprising:
an input-output panel including
a first substrate,
a second substrate that faces the first substrate,
a liquid crystal layer that is between the first substrate and the second substrate,
a plurality of display electrodes on the first substrate that provide an electric field to the liquid crystal layer, each display electrode including a pixel electrode, an insulating film, and a common electrode arranged in order from the liquid crystal layer to the first substrate, and
a plurality of counter sensor electrodes on the second substrate, each configured to be brought into contact with a corresponding pixel electrode of the plurality of display electrodes when the second substrate is deflected;
the input-output panel being configured to detect the plurality of external proximity objects based on a change in electric potential of pixel electrodes respectively opposed to the corresponding counter sensor electrodes;
a position detection section configured to generate position information and area information of the plurality of external proximity objects based on the detection of the plurality of external proximity objects by the input-output panel; and
an image generation section configured to generate drawing data based on the position information and the area information relative to a behavior of the plurality of external proximity objects for making a conversion table defining a correspondence relationship between the respective area sizes of the plurality of external proximity objects and the drawing data, and to generate an image according to the respective area sizes of the plurality of external proximity objects represented by the area information and the drawing data using the conversion table,
wherein each of the plurality of counter sensor electrodes includes a plurality of patterns that are arranged opposite to the corresponding pixel electrode such that respective centers of the opposed surfaces of the counter sensor electrodes directly face edges of the corresponding pixel electrodes, and
wherein upon generation of the drawing data in two time frames at two different time points by the image generation section, the drawing data between the two time frames are interpolated with the drawing data stored in the conversion table, so that the image is smoothly changed between the two different time points.

2. The information input-output device according to claim 1, wherein the input-output panel comprises:
a set of space control columns including alternating first and second space control columns, wherein at least one of the first space control column forms a gap and at least one of the second space control column comprises the counter sensor electrode.

3. The information input-output device according to claim 1, wherein the counter sensor electrode includes a plurality of slits and the plurality of patterns.

4. The information input-output device according to claim 1, wherein the drawing data includes drawing attributive information and the position information, the drawing attributive information including at least one of line width, a tone, and a hue, and
wherein the image generation section generates the drawing data such that the drawing attribution information varies in accordance with the corresponding area size of a respective one of the external proximity objects.

5. The information input-output device according to claim 4, wherein the image generation section has a conversion table defining a correspondence relationship between the corresponding area size of the respective one of the external proximity objects and the drawing attributive information.

6. The information input-output device according to claim 5, wherein the correspondence relationship between the corresponding area size of the respective one of the external proximity objects and the drawing attributive information is defined by a linear function in the conversion table.

7. The information input-output device according to claim 4, wherein when a plurality pieces of the area information are acquired along a time base in accordance with movement of the respective one of the external proximity objects, the image generation section determines drawing attributive information according to each piece of the area information and then performs, based on the determined drawing attributive information, an interpolation that generates and inserts additional drawing attributive information that gradually varies the determined drawing attributive information while the drawing data is generated.

8. The information input-output device according to claim 1 further comprising:
 a read circuit connected to a signal line that is connected to the plurality of pixels formed in the matrix, and configured to detect a voltage of the signal line via a read switch disposed between the read circuit and the pixel electrodes; and
 a write circuit connected to the signal line configured to apply a voltage through the signal line to each of the pixel electrodes via a write switch disposed between the write circuit and the pixel electrodes,
 wherein the read circuit and the write circuit differentially operate.

* * * * *